US008812551B2

(12) United States Patent
Naick et al.

(10) Patent No.: US 8,812,551 B2
(45) Date of Patent: Aug. 19, 2014

(54) CLIENT-SIDE MANIPULATION OF TABLES

(75) Inventors: Indran Naick, Cedar Park, TX (US); Jeffrey K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1561 days.

(21) Appl. No.: 10/992,517

(22) Filed: Nov. 18, 2004

(65) Prior Publication Data

US 2006/0106844 A1    May 18, 2006

(51) Int. Cl.
  *G06F 7/00*    (2006.01)
(52) U.S. Cl.
  USPC .......................................................... 707/791
(58) Field of Classification Search
  None
  See application file for complete search history.

(56) References Cited

U.S. PATENT DOCUMENTS

| | | | | |
|---|---|---|---|---|
| 6,049,783 | A | 4/2000 | Segal et al. | 705/37 |
| 6,055,542 | A | 4/2000 | Nielsen et al. | 707/104 |
| 6,373,504 | B1 * | 4/2002 | Nielsen | 715/739 |
| 6,434,560 | B1 | 8/2002 | Case | 707/7 |
| 6,601,061 | B1 * | 7/2003 | Holt et al. | 707/3 |
| 6,613,098 | B1 | 9/2003 | Sorge et al. | 715/503 |
| 6,701,485 | B1 | 3/2004 | Igra et al. | 715/503 |
| 6,714,979 | B1 * | 3/2004 | Brandt et al. | 709/225 |
| 6,744,452 | B1 * | 6/2004 | McBrearty et al. | 715/853 |
| 2002/0055981 | A1 | 5/2002 | Spacy et al. | 709/217 |
| 2002/0065846 | A1 | 5/2002 | Ogawa et al. | 707/503 |
| 2002/0105533 | A1 | 8/2002 | Cristo | 345/706 |
| 2002/0107871 | A1 | 8/2002 | Wyzga et al. | 707/104.1 |
| 2002/0174140 | A1 | 11/2002 | Peake, Jr. et al. | 707/500 |
| 2002/0184148 | A1 * | 12/2002 | Kahn et al. | 705/40 |
| 2003/0009538 | A1 * | 1/2003 | Shah et al. | 709/219 |
| 2003/0065662 | A1 | 4/2003 | Cosic | |
| 2003/0101234 | A1 * | 5/2003 | McBrearty et al. | 709/218 |
| 2003/0103070 | A1 | 6/2003 | Tiongson et al. | |
| 2003/0151621 | A1 * | 8/2003 | McEvilly et al. | 345/744 |
| 2004/0199497 | A1 * | 10/2004 | Timmons | 707/3 |
| 2004/0254927 | A1 * | 12/2004 | Lang et al. | 707/5 |
| 2005/0149517 | A1 * | 7/2005 | Cosic | 707/3 |
| 2007/0011321 | A1 * | 1/2007 | Huntington et al. | 709/224 |

FOREIGN PATENT DOCUMENTS

| | | | | |
|---|---|---|---|---|
| JP | 2004102872 | 4/2004 | | G06F 12/00 |
| TW | 530231 | 5/2003 | | |

\* cited by examiner

*Primary Examiner* — Apu Mofiz
*Assistant Examiner* — Thu Nga Nguyen
(74) *Attorney, Agent, or Firm* — John D. Flynn; Gregory K. Goshorn; Greg Goshorn, P.C.

(57) ABSTRACT

Provided is a system and method for providing a browser functionality to determine the existence of a table, identify data therein and manipulate the data according to a user's input. Thus, a method for manipulating data tables in a client machine includes determining at the client machine, existence of a table via a loaded graphical user interface operable with a markup language; extracting data from the table; storing the data from the table in a local cache; manipulating the data in the local cache; and displaying the data in a user-defined table by applying a function within the graphical user interface. The table on the client computer can be generated by the graphical user interface loading a Web page from a server machine, a Web browser or can be operable with a Web browser. Alternatively, the function within the graphical user interface is a preset set of functions.

16 Claims, 4 Drawing Sheets

CLIENT-SIDE MANIPULATION OF TABLES

TECHNICAL FIELD

The present invention relates generally to sorting tables, and, more specifically, to a system and method for client-side sorting of tables received via a Web page, such as Hyper Text Markup Language (HTML) type tables.

BACKGROUND OF THE INVENTION

Extensible Markup Language (XML) is a meta-markup language that provides a format for describing structured data. XML is similar to HTML in that it is a tag-based language. By virtue of its tag-based nature, XML defines a strict tree structure or hierarchy. XML is a derivative of Standard Generalized Markup Language (SGML) that provides a uniform method for describing and exchanging structured data in an open, text-based format. XML utilizes the concepts of elements and namespaces. Compared to HTML, which is a display-oriented markup language, XML is a general-purpose language used to represent structured data without including information that describes how to format the data for display.

SGML a system for organizing and tagging elements of a document. SGML was developed and standardized by the International Organization for Standards (ISO) in 1986. SGML itself does not specify any particular formatting; rather, it specifies the rules for tagging elements. These tags can then be interpreted to format elements in different ways.

SGML is used widely to manage large documents that are subject to frequent revisions and need to be printed in different formats. Because it is a large and complex system, it is not yet widely used on personal computers. However, the growth of Internet, and especially the World Wide Web, is creating renewed interest in SGML because the World Wide Web uses HTML, which is one way of defining and interpreting tags according to SGML rules.

Within an XML document, namespace declarations occur as attributes of start tags. Namespace declarations are of the form "xmlns:[prefix]=[uri]". A namespace declaration indicates that the XML document contains element names that are defined within a specified namespace or schema. Prefix is an arbitrary designation that is used later in an XML document as an indication that an element name is a member of the namespace declared by URI. The prefix is valid only within the context of the specific XML document. "URI" or universal resource indicator is either a path to a document describing a specific namespace or schema or a globally unique identifier of a specific namespace or schema. A URI is valid across all XML documents. Namespace declarations are "inherited", which means that a namespace declaration applies to the element in which it was declared as well as to all elements contained within that element.

One exemplary usage of XML or HTML is the exchange of data between different entities, such as client and server computers, in the form of requests and responses. A client might generate a request for information or a request for a certain server action, and a server might generate a response to the client that contains the information or confirms whether the certain action has been performed. The contents of these requests and responses are "XML and HTML documents", which are sequences of characters that comply with the specification of HTML or XML. Part of the document exchange process between clients and servers involves parsing the XML documents when they are received.

After a client generates a request for information, and receives an XML or HTML document, often within the XML or HTML documents, tables are generated that display information in a format that is not in an order desired by the user. For example, in searching for a product on a Web site, a list of items may appear in no particular order or in an order not immediately apparent to a user. For example, the items may be based on a product number, but the columns shown to a user may not include product numbers and there is no indication of a relationship in the data. Moreover, a user viewing a table in a document often would like to reorder the table based on the table content, such as data pricing, product name and the like. Current methods addressing table reordering are cumbersome and involve resending a request for additional information or require a client-side application that works with a dynamic HTML or special HTML tags or having a Web browser interact with an Excel spreadsheet function. Such method further can require programming a table on the client side with DHTML and JavaScript to include the additional functionality. Since added programming effort and skill is required to enable a table included in a Web page to include additional functionality, most tables in Web pages do not have user-reorder capable tables. Aside from the inherent difficulties with enabling tables to be programmed with reorder functions on a Web page, current methods of client-side manipulations of tables require awkward techniques. For example, a user could copy a table from a Web page and paste the data into a spreadsheet, but this requires an end user to own a copy of the software and own a license for the software, such as Excel software.

SUMMARY OF THE INVENTION

Provided is a system and method for providing a browser functionality to determine the existence of a table, identify data therein and manipulate the data according to a user's input. Thus, a method for manipulating data tables in a client machine includes determining at the client machine, existence of a table via a loaded graphical user interface operable with a markup language; extracting data from the table; storing the data from the table in a local cache; manipulating the data in the local cache; and displaying the data in a user-defined table by applying a function within the graphical user interface. The manipulating can include sorting the data in the local cache which could include re-sorting the data according to user-defined parameters. The user-defined parameters can include determining a column by which to sort and a row by which to sort. The table on the client computer can be generated by the graphical user interface loading a Web page from a server machine. The graphical user interface can be a Web browser or can be operable with a Web browser. Alternatively, the function within the graphical user interface is a preset set of functions.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE FIGURES

Figure 1:
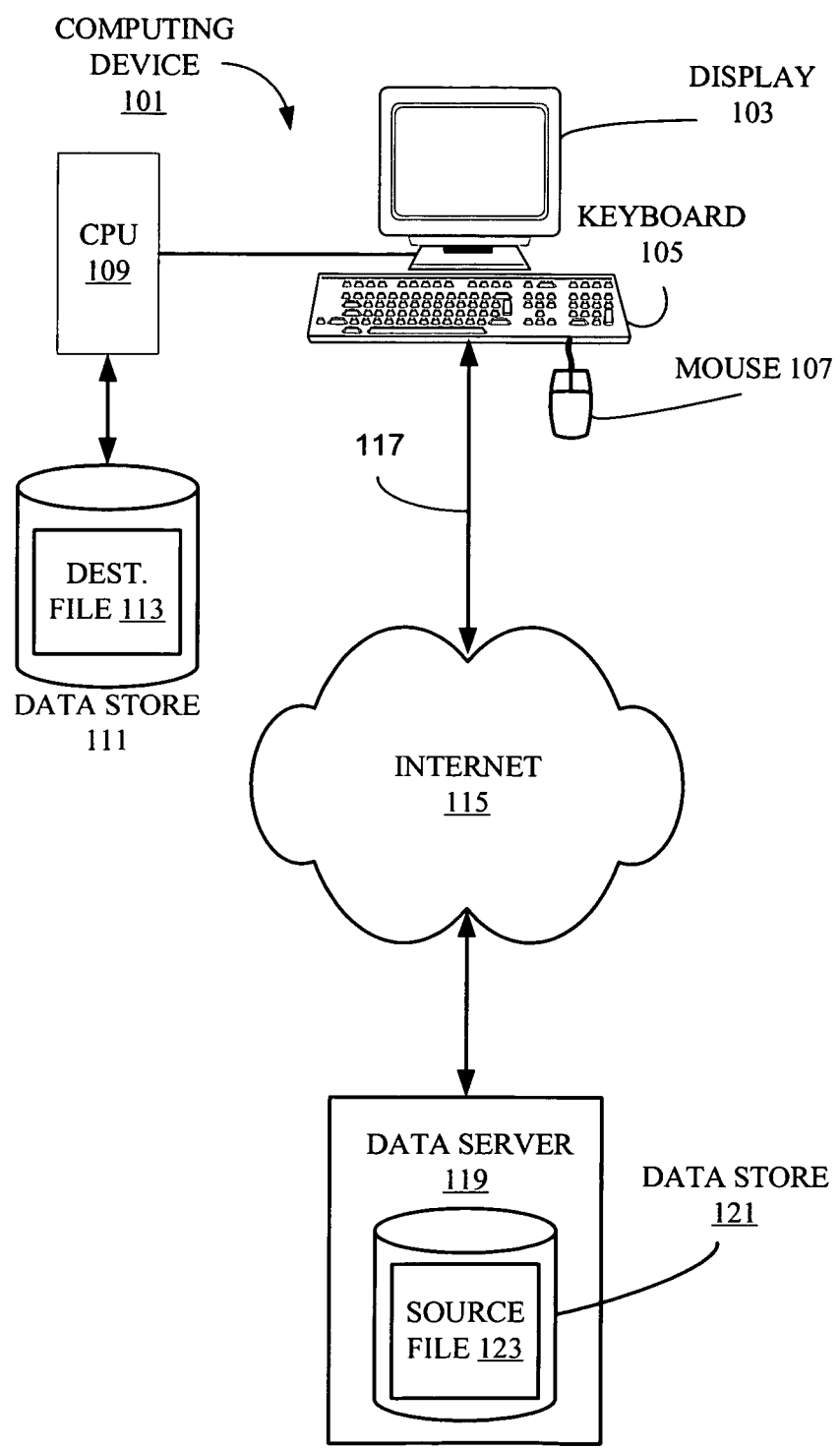
FIG. 1 is a block diagram of an exemplary system architecture that supports the claimed subject matter.

FIG. 1 illustrates an exemplary architecture 100 in which the system according to the present invention is implemented. Those with skill in the computing arts will recognize that the disclosed embodiments have relevance to a wide variety of applications and architectures in addition to those described below. In addition, the functionality of the present invention can be implemented in software, hardware, or a combination of software and hardware. The hardware portion can be implemented using specialized logic; the software portion can be stored in a memory or recording medium and executed by a suitable instruction execution system such as a microprocessor.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

FIG. 1 is a block diagram of an exemplary system architecture 100 that supports the claimed subject matter. System 100 includes a computing device 101, which in this example is a personal computer (PC). Attached to PC 101 are a display 103, a keyboard 105, and a mouse 107. Display 103, keyboard 105 and mouse 107 provide a user with means to interact with PC 101. Also included in PC 101 are a central processing unit (CPU) 109 and a recording medium, or data store 111. Those with skill in the computing arts should be familiar with PC 101 and related components 103, 105, 107, 109 and 111.

PC 101 is connected to the Internet 115 via a connection 117. Also coupled to Internet 115 is a data server 119 with a data store 121. A user of PC 101 can access various information sources, such as a source file 123 on data store 119, via Internet 115.

PC 101 can be configured to be a Web server that processes requests from a client application or can be configured as a client that sends requests to a connected Web server.

Figure 2:
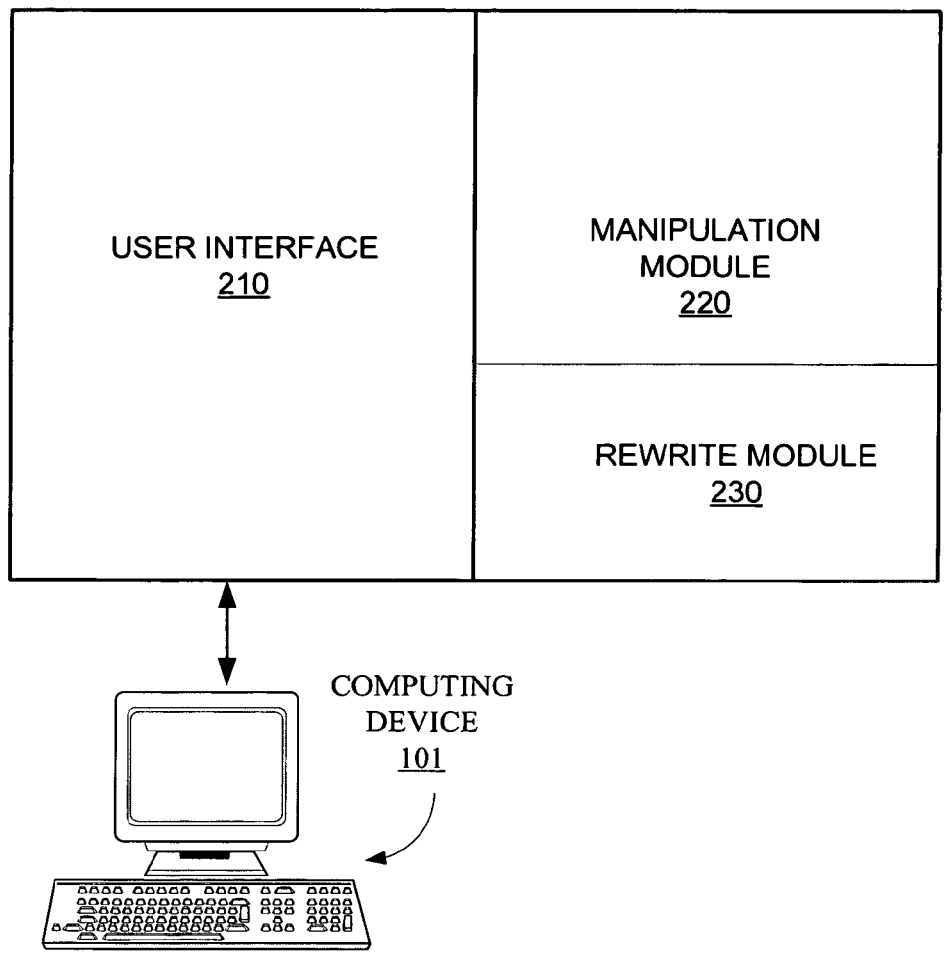
FIG. 2 is a block diagram of a portal server system that supports the claimed subject matter.

According to an embodiment, PC 101 can be configured as a computer that includes a table application in accordance with an embodiment. More particularly, referring to FIG. 2, according to an embodiment, a client application provides functionality to reorder tables displayed in a browser or other application that displays markup text like HTML or XML. The application can be implemented on the client either natively in the browser or as a plugin. As shown in FIG. 2, the implementation of the function includes three components: a user interface 210; manipulation module 220 to reorder or manipulate data; and rewrite module 230 to rewrite the original cached HTML or XML data. More particularly, user interface 210 can be an end user interface that enables a user to select an appropriate table to sort. Manipulation module 220 can be implemented as logic that reorders data held in memory of PC 101.

Figure 3:
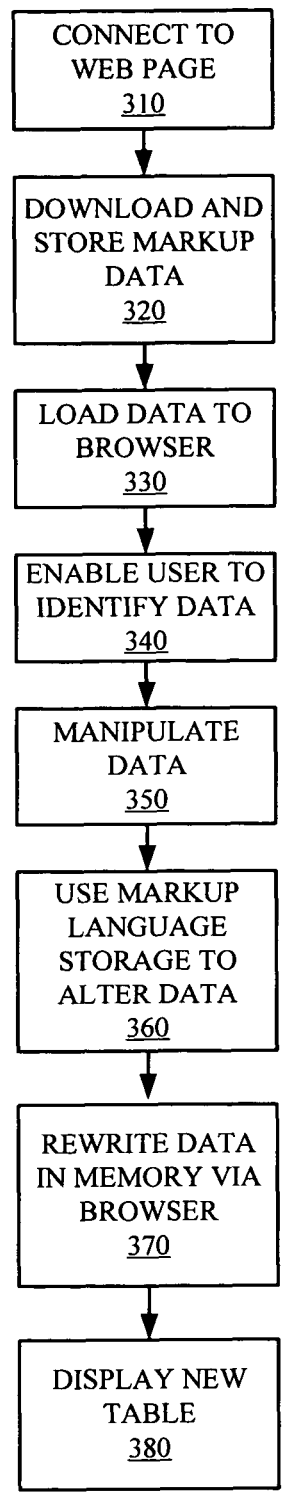
FIG. 3 is a flow diagram illustrating a method in accordance with an embodiment of the present invention.

Referring now to FIG. 3, a flow diagram illustrates a method in accordance with an embodiment. As shown, block 310 provides for connecting to a Web page. For example, a user connecting via the Internet to a Web page. Alternatively, the page could be any page via a network for which a browser is capable of displaying. Block 320 provides for downloading and storing markup data. If the browser displays the page via XML or HTML the data is stored via the markup language and according to an appropriate stylesheet. Block 330 provides for loading the data held in memory in the browser or in another application.

According to the prior art, a table present in the Web page would be displayed as a simple HTML table with no logic. According to an embodiment, block 340 provides for enabling a user to identify data to indicate to the browser to reorder the table. For example, if a specific table is present in the Web page that a user would like to reorder, the user could right-click on the specific table or otherwise indicate via tap on a tablet PC, highlight appropriate data or the like that the table has been chosen for purposes of reordering. The location chosen by a user can be dynamic, such that clicks on the page could relate to a specific cell, a double click could relate to another set of data. As one of skill in the art will appreciate with the benefit of this disclosure, the method by which a user identifies a cell for reordering or choosing on which to base a reordering can be altered or customized according to a user's needs. For example, because tables are hierarchical, a browser will be able to respond to a cell that was chosen by a user. A cell can be part of a row, which, in turn could be part of one more tables. A cell can also represent a specific table row if a column is "nested." Likewise, a table row can be nested within a specific table. Note that if a cell does not specifically identify a desired portion of a table, additional functionality could be configured to determine if a cell was or was not part of a desired row to be manipulated by a user.

Also, a table could be nested within another cell which could represent a row of a table and other cells in either rows or tables. Thus, as is known by those of skill in the art, an XML or HTML based browser will be able to determine the column of a specific table that may require reordering by "walking the tree" of a document object model (DOM). Walking the tree would first note the specific cell (or column) of a given table. Once a specific cell of a table is determined, a user can interact with the browser by clicking a button or some other mechanism that allows the user to select the appropriate table. That is, assuming a table selected was nested within another table that a user wants to resort the input mechanism would be able to determine precisely the cell that would require resorting.

Block 350 provides for manipulating data, such as resorting or filtering the data specified by the user. More particularly, once a user indicates specifically which table and column to resort, a resorting method can be applied. As is known in the art, many resorting algorithms are available to implement a resorting of table data. For example, a basic resorting algorithm could be applied if each cell in the desired column to resort is stripped from the markup data and filtered through the resorting algorithm. Advantageously, XML and HTML documents store original data as structured data stored in memory. According to an embodiment, therefore, block 360 provides for using markup language storage to alter the data, for example, to determine how many positions to move each row of a table up or down.

Block 370 provides for rewriting the data in memory via the browser. Block 380 provides for displaying the new table. The new table will be filtered, resorted or otherwise manipulated. Thus, there is no need to go back to the source server for additional information or for the original developer to write code to embed in the HTML.

In one embodiment, instead of a sorting algorithm, a filter is applied to perform a search, for example, that is used to highlight data or separate data with certain characteristics desired by the user. For example, if the table relates to products that a user wishes to view and the user has specific criteria of interest for the given products, a filter could filter out all products that do not meet the user's criteria. A table of available automobiles could be filtered to remove automobiles above and below a certain price point without requiring an additional server download or interaction with a server. Rather, once data is downloaded to the browser, the browser could be run offline to perform tasks using the resorting and filtering techniques described herein, thereby reducing traffic over networks.

In another embodiment, the browser is configured to store resorted or filtered data and display a page according to each resort or filter or all together. Displaying each page sorted, in an embodiment includes providing logic to make appropriate assumptions on which rows require sorting such as looking for logical places to automate. For example, a resorting based on rows could be configured to store data, for example, including data that appears to be currency.

Figure 4:
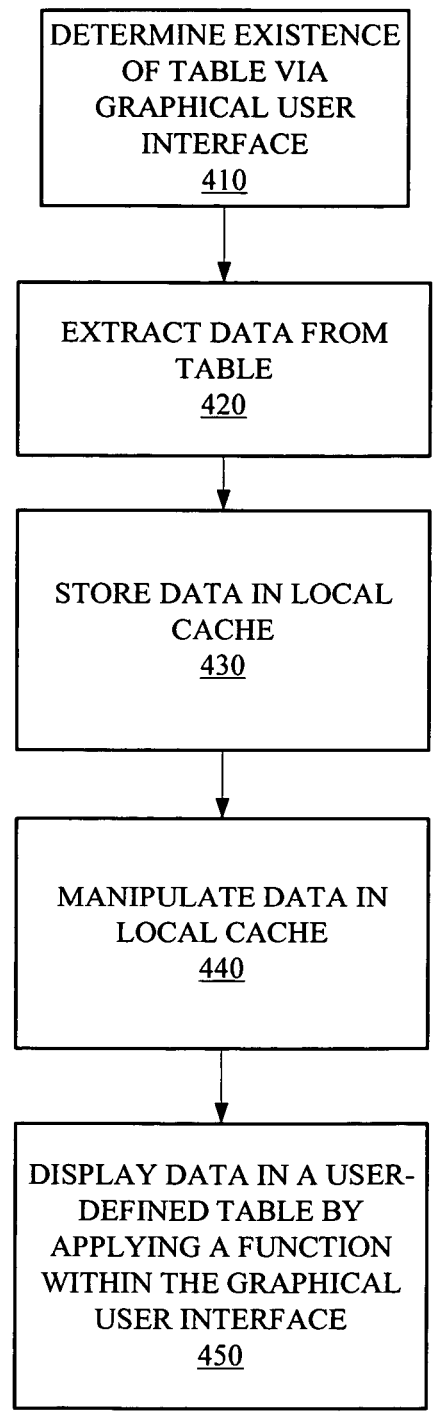
FIG. 4 is a flow diagram illustrating a method in accordance with an embodiment of the present invention.

Referring now to FIG. 4, a flow diagram illustrates an embodiment a method according to an embodiment for sorting tables in a client machine. Block 410 provides for determining at the client machine, existence of a table via a loaded graphical user interface operable with a markup language. Block 420 provides for extracting data from the table. Block 430 provides for storing the data from the table in a local cache. Block 440 provides for manipulating the data in the local cache. The manipulating can be sorting or can include filtering the data according user-defined criteria. Block 450 provides for displaying the data in a user-defined table by applying a function within the graphical user interface.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified steps performed in the same or a different order.

We claim:

1. A method for manipulating tables from a server machine at a client machine, the method comprising:
   determining at the client machine, existence of a table for display on a loaded graphical user interface on the client machine wherein the table is displayed with a markup language;
   extracting data from the table on the client machine;
   storing the data from the table in a local cache on the client machine;
   manipulating the data in the local cache to produce manipulated data; and
   displaying the manipulated data in the table by altering the markup language.

2. The method of claim 1 wherein the manipulating the data in the local cache further comprises sorting or re-sorting the data according to user-defined parameters.

3. The method of claim 2 wherein the user-defined parameters include one or more of a column by which to sort and a row by which to sort.

4. The method of claim 1 wherein the table on the client computer is generated by the graphical user interface loading a Web page from a server machine.

5. The method of claim 4 wherein the graphical user interface is a Web browser.

6. The method of claim 1 wherein the graphical user interface is operable with a browser, the browser being configured to store resorted or filtered data from the table and display a page according to each resort or filter.

7. The method of claim 1 wherein the manipulating includes sorting according to a sorting algorithm run via a program on the client machine.

8. A computer program product comprising code, stored on a memory for execution on a processor, for performing acts manipulating tables from a server machine at a client machine, the acts including:
   determining at the client machine, existence of a table for display in a loaded graphical user interface on the client machine wherein the table is displayed with a markup language;
   extracting data from the table at the client machine;
   storing the data from the table in a local cache on the client machine;
   manipulating the data in the local cache to produce manipulated data; and
   displaying the manipulated data in the table by altering the markup language.

9. The computer program product of claim 8 wherein the manipulating the data in the local cache further comprises sorting or re-sorting the data according to user-defined parameters.

10. The computer program product of claim 8 wherein the user-defined parameters include one or more of a column by which to sort and a row by which to sort.

11. The computer program product of claim 8 wherein the table on the client computer is generated by the graphical user interface loading a Web page from a server machine.

12. The computer program product of claim 11 wherein the graphical user interface is a Web browser.

13. The computer program product of claim 8 wherein the manipulating includes sorting according to a sorting algorithm run via a program on the client machine.

14. A computer system comprising:
   a processor on a client machine;
   a memory coupled to the processor;
   a graphical user interface coupled to the processor, the graphical user interface configured to determine existence of a table from a server machine for display in the loaded graphical user interface wherein the table is displayed with a markup language;
   a manipulation module, executed on the processor, configured to extract data from the table, store the data from the table in a local cache and manipulate the data in the local cache to produce manipulated data; and
   a rewrite module, executed on the processor, configured to display the manipulated data in the table by altering the markup language.

15. The computer system of claim 14 wherein the manipulation module performs a sorting algorithm run via a program on the client machine.

16. A method for manipulating data displayed in a graphical user interface, the method comprising:
   receiving at a client machine a web page comprising a table storing data arranged in a first order using a first HTML data;
   extracting the data from the table to produce extracted data;
   storing the extracted data in a local cache on the client machine to produce stored data;
   manipulating the stored data using a user-defined function to put the data in a second order to produce reordered data;

modify the HTML data to display the reordered data in the table rather than the data arranged in the first order to produce a modified web page; and displaying the modified web page in the graphical user interface.

* * * * *